United States Patent
Lynch et al.

(10) Patent No.: US 7,426,806 B2
(45) Date of Patent: Sep. 23, 2008

(54) REVERSE MOLDED PANEL, METHOD OF MANUFACTURE, AND DOOR MANUFACTURED THEREFROM

(75) Inventors: Steven K. Lynch, St. Charles, IL (US); Dale E. Schafernak, Palatine, IL (US); Karine Luetgert, Geneva, IL (US); Bei-Hong Liang, Naperville, IL (US); Lee Braddock, Huntley, IL (US)

(73) Assignee: Masonite Corporation, Tampa, FL (US)

( * ) Notice: Subject to any disclaimer, the term of this patent is extended or adjusted under 35 U.S.C. 154(b) by 1072 days.

(21) Appl. No.: 10/264,255

(22) Filed: Oct. 4, 2002

(65) Prior Publication Data
US 2004/0074186 A1    Apr. 22, 2004

Related U.S. Application Data

(63) Continuation-in-part of application No. 09/761,394, filed on Jan. 16, 2001, now Pat. No. 6,588,162, which is a continuation-in-part of application No. 09/742,840, filed on Dec. 21, 2000, now abandoned.

(60) Provisional application No. 60/198,709, filed on Apr. 20, 2000.

(51) Int. Cl.
*E06B 3/70* (2006.01)
*E04F 13/00* (2006.01)
*E04C 2/54* (2006.01)

(52) U.S. Cl. .............. 52/455; 52/309.13; 52/311.1; 52/784.1

(58) Field of Classification Search .......... 52/455, 52/764, 309.1, 309.13, 309.14, 313, 390, 52/474, 784.1; 428/106, 174, 537.1, 156
See application file for complete search history.

(56) References Cited

U.S. PATENT DOCUMENTS

| | | |
|---|---|---|
| 3,402,520 A | 9/1968 | Lee |
| 3,634,986 A | 1/1972 | Ford |
| 4,061,813 A | 12/1977 | Geimer |
| 4,159,302 A | 6/1979 | Greve |
| 4,236,365 A | 12/1980 | Wheeler |
| 4,265,067 A | 5/1981 | Palmer |
| 4,378,265 A | 3/1983 | Kiss |
| 4,381,328 A | 4/1983 | Bunner |
| 4,552,797 A | 11/1985 | Munk |
| 4,610,900 A | 9/1986 | Nishibori |

(Continued)

FOREIGN PATENT DOCUMENTS

DE    30 45 702 A1    7/1942

(Continued)

*Primary Examiner*—Robert Canfield
*Assistant Examiner*—Ryan D Kwiecinski
(74) *Attorney, Agent, or Firm*—Berenato, White & Stavish

(57) ABSTRACT

A reverse molded wood composite door skin, comprises a molded wood composite panel having a first surface adapted to be exteriorly disposed and an opposite second surface adapted to be interiorly disposed in order to be adhesively secured to a surface. The panel comprises a major planar portion, at least one planar panel portion lying in a plane spaced from the plane of the major planar portion, and an outwardly extending contoured wall surrounding the planar panel portion and interconnecting and integral with the major planar portion and the at least one planar panel portion. The contoured wall extends outwardly from and relative to the first surface.

36 Claims, 13 Drawing Sheets

U.S. PATENT DOCUMENTS

| | | |
|---|---|---|
| 4,612,224 A | 9/1986 | Davis |
| 4,622,190 A | 11/1986 | Schultz |
| 4,726,881 A | 2/1988 | Schultz |
| 4,734,236 A | 3/1988 | Davis |
| 4,812,188 A | 3/1989 | Hansen |
| 4,844,968 A | 7/1989 | Persson |
| 4,865,788 A | 9/1989 | Davis |
| 4,960,548 A | 10/1990 | Ikeda |
| 4,960,553 A | 10/1990 | De Bruine |
| 4,969,302 A | 11/1990 | Coggan |
| 5,028,374 A | 7/1991 | Imao |
| 5,074,087 A * | 12/1991 | Green .................. 52/309.9 |
| 5,075,059 A * | 12/1991 | Green .................. 264/129 |
| 5,090,173 A | 2/1992 | Coggan |
| 5,142,835 A | 9/1992 | Mrocca |
| 5,154,968 A | 10/1992 | DePetris |
| 5,175,970 A | 1/1993 | Green |
| 5,397,406 A | 3/1995 | Vaders |
| 5,443,891 A | 8/1995 | Bach |
| 5,470,631 A | 11/1995 | Lindquist |
| 5,525,394 A | 6/1996 | Clarke et al. |
| 5,534,352 A | 7/1996 | Pittman |
| 5,543,234 A * | 8/1996 | Lynch et al. ........ 428/537.1 |
| 5,614,231 A | 3/1997 | Rinker |
| 5,647,934 A | 7/1997 | Vaders |
| D382,350 S * | 8/1997 | Lynch .................. D25/138 |
| 5,718,786 A | 2/1998 | Lindquist |
| 5,766,774 A * | 6/1998 | Lynch et al. ........ 428/537.1 |
| 5,782,055 A * | 7/1998 | Crittenden .......... 52/784.1 |
| 5,851,325 A | 12/1998 | Terada |
| 5,887,402 A | 3/1999 | Ruggie |
| 6,161,363 A | 12/2000 | Herbst |
| 6,189,276 B1 | 2/2001 | Pinto |
| 6,200,687 B1 * | 3/2001 | Smith et al. ........ 428/537.1 |
| 6,226,958 B1 | 5/2001 | West |
| 6,312,540 B1 * | 11/2001 | Moyes .................. 156/87 |
| 6,364,982 B1 | 4/2002 | Lynch |
| 6,397,541 B1 | 6/2002 | Brewer |
| 6,588,162 B2 * | 7/2003 | Lynch et al. ........ 52/309.13 |
| D495,061 S * | 8/2004 | Lynch et al. ........ D25/48 |
| 6,773,791 B1 * | 8/2004 | Ruggie et al. ....... 428/156 |
| D507,835 S * | 7/2005 | Lynch et al. ........ D25/48 |
| D516,225 S * | 2/2006 | Lynch et al. ........ D25/48 |
| D516,226 S * | 2/2006 | Lynch et al. ........ D25/48 |
| 7,021,015 B2 * | 4/2006 | Lynch et al. ........ 52/309.13 |
| D529,624 S * | 10/2006 | Lynch et al. ........ D25/48 |
| 7,137,232 B2 * | 11/2006 | Lynch et al. ........ 52/784.1 |
| 2001/0029714 A1 * | 10/2001 | Lynch et al. ........ 52/309.13 |
| 2001/0030016 A1 | 10/2001 | Lynch |
| 2002/0108337 A1 | 8/2002 | Clarke |
| 2003/0196396 A1 * | 10/2003 | Lynch et al. ........ 52/311.1 |
| 2004/0074186 A1 * | 4/2004 | Lynch et al. ........ 52/455 |

FOREIGN PATENT DOCUMENTS

| | | |
|---|---|---|
| DE | 1 210 551 | 2/1966 |
| DE | 1 912 300 | 10/1969 |
| DE | 1 092 183 | 11/1969 |
| DE | 2 142 003 | 3/1973 |
| DE | 2316250 | 10/1974 |
| DE | 2339 796 | 3/1975 |
| DE | 24 37 131 | 2/1976 |
| DE | 25 37 766 | 3/1977 |
| DE | 2945843 A1 | 5/1981 |
| DE | 3419824 A1 | 11/1985 |
| DE | 40 30 586 A1 | 4/1991 |
| DE | 296 03 593 U1 | 5/1996 |
| DE | 37 12 972 C2 | 7/1998 |
| DE | 695 13 400 T2 | 5/2000 |
| DE | 101 34 673 A1 | 4/2002 |
| DE | 695 22 506 T2 | 5/2002 |
| EP | 0225 628 | 6/1987 |
| EP | 0225 629 | 6/1987 |
| EP | 0 246 208 | 11/1987 |
| EP | 0 246 208 B1 | 8/1990 |
| EP | 0 635 616 A1 | 1/1995 |
| EP | 0 688 639 A2 | 12/1995 |
| EP | 0688 639 A3 | 3/1996 |
| EP | 0 770 007 B1 | 11/1999 |
| EP | 1 066 936 A1 | 7/2000 |
| EP | 1 190 825 A2 | 3/2001 |
| FR | 1 409 105 | 9/1964 |
| FR | 2144876 | 7/1972 |
| GB | 937 710 | 9/1963 |
| GB | 1 099 928 | 1/1968 |
| GB | 2 024 085 A | 1/1980 |
| GB | 2 080 721 A | 2/1982 |
| GB | 2 237 040 A | 4/1991 |
| GB | 2269558 A * | 2/1994 |
| JP | 53-47623 | 4/1978 |
| JP | 59-59433 | 4/1984 |
| WO | WO 87/02407 | 4/1987 |
| WO | WO 96/02395 | 2/1996 |
| WO | WO 99/62680 | 12/1999 |
| WO | WO 00/04249 | 1/2000 |
| WO | WO 00/67972 | 11/2000 |
| WO | WO 01/38058 A1 | 5/2001 |
| WO | WO 01/38058 A2 | 5/2001 |
| WO | WO 01/81055 A1 | 11/2001 |
| WO | WO 02/24467 A1 | 3/2002 |
| WO | WO 02/053334 A2 | 7/2002 |
| WO | WO 02/053334 A3 | 7/2002 |

* cited by examiner

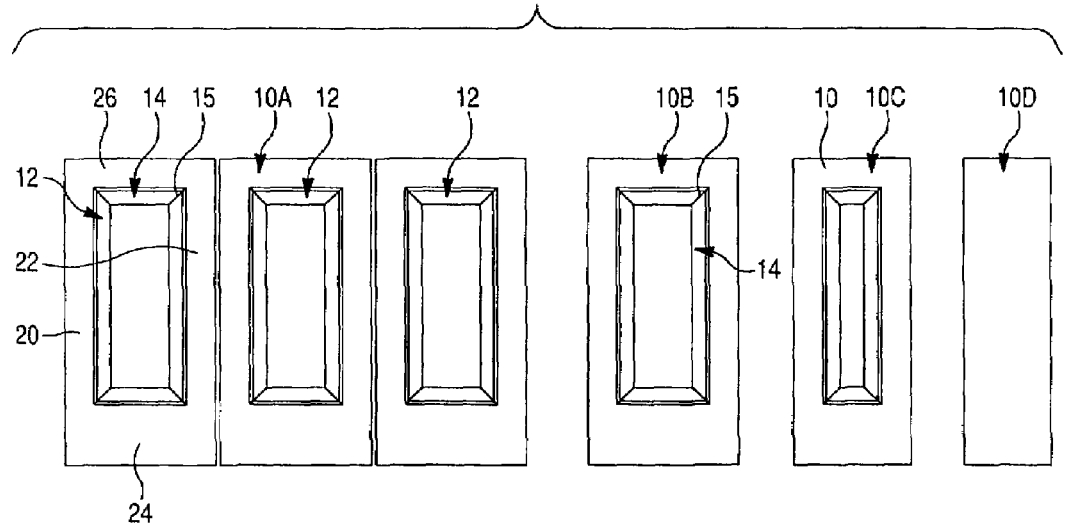
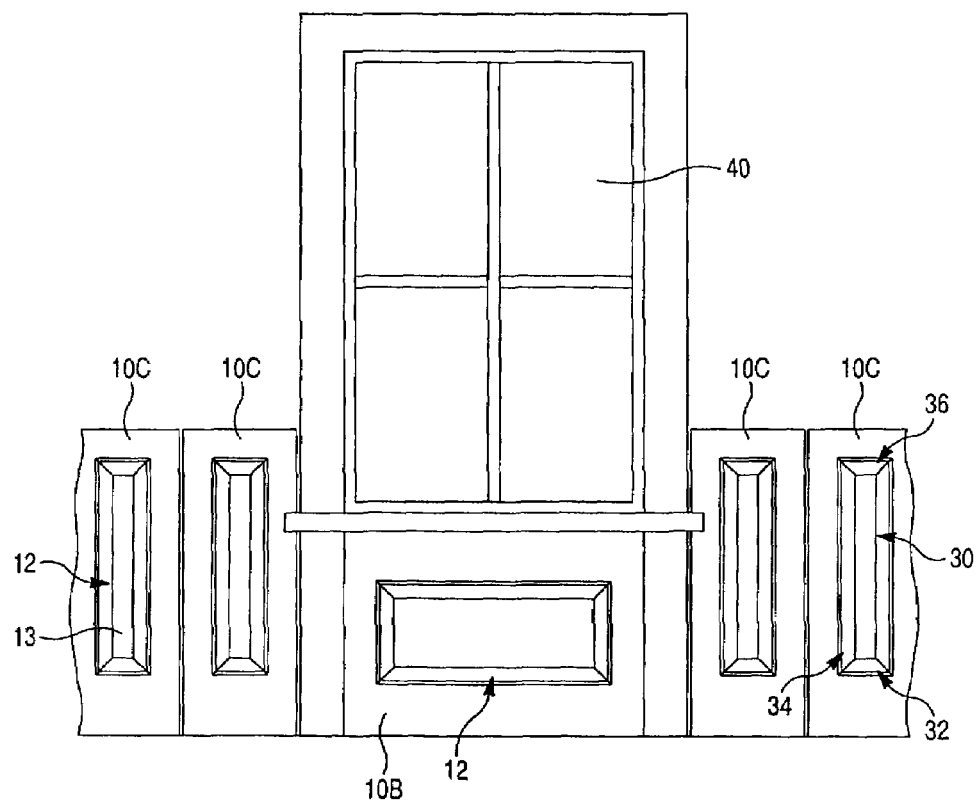

REVERSE MOLDED PANEL, METHOD OF MANUFACTURE, AND DOOR MANUFACTURED THEREFROM

CROSS-REFERENCE TO RELATED APPLICATION

This application is a continuation-in-part of U.S. patent application Ser. No. 09/761,394, filed Jan. 16, 2001 now U.S. Pat. No. 6,588,162, which is a continuation-in-part of U.S. patent application Ser. No. 09/742,840, filed Dec. 21, 2000 now abandoned, which is based on U.S. Provisional Patent Application Ser. No. 60/198,709 filed Apr. 20, 2000, the disclosures of all of which are incorporated herein by reference.

FIELD OF THE INVENTION

The present invention relates to a reverse molded (profile up, as molded) wood composite article particularly useful for the manufacture of a wainscot panel, and also useful as a door skin or door-facing surface for a hollow core door or a plant-on molded door facing component, and to a method of making the reverse molded wood composite article, having an upwardly inclined profile molded upwardly from a planar base portion of the article. More particularly, the molded wood composite article of the present invention is made from a cellulosic mat containing a combination of cellulosic fibers, preferably including at least about 40% by weight, preferably at least about 60%, softwood fibers (from trees that produce cones), such as all species of pine, and fir, e.g., Southern Pine, based on the total dry fiber weight, and from about 60% by weight to about 40% by weight mixed hardwoods, such as oak, gum, and poplar, and a natural or synthetic binder, such as a phenol formaldehyde or urea formaldehyde resin. The cellulosic mat includes at least about 80% refined, fibrillated cellulosic fibers, e.g., a compressed wood fiber mat, such as that hot-pressed to produce high density hardboard. The upper surface of the molded article; i.e., that surface intended to be exteriorly exposed in the finished door, wainscot, etc., has excellent molding die fidelity and may have a smooth finish or may be embossed to simulate a hardwood grain pattern, such as oak, simulating furniture grade natural wood. The articles are molded from a planar layer or mat of cellulosic fibers, e.g., a fiberboard mat, made either by the wet process or the dry process, preferably the dry process. In a preferred embodiment, the fiberboard mat is one to four inches in thickness before molding, and after molding is ⅛ to ¼ inch in thickness having co-planar stiles and rails, and planar back surfaces surrounding the molded panels, such that the co-planar back surfaces are adapted for flush contact against a wall, door surface, or door frame, particularly between a wall base board and chair rail, as a wainscot outer wall surface lining for an interior household wall. In accordance with another embodiment of the invention, the reverse molded panels are manufactured in a kit, including a plurality of differently sized panels adapted to completely line an interior wall, regardless of wall dimension.

BACKGROUND OF THE INVENTION

Man-made boards, such as fiberboard, e.g., hardboard, commonly are embossed downwardly on their intended visible major outer surface in the manufacture of interior paneling, exterior siding, and particularly in the manufacture of door skins, such that exterior surfaces, such as stiles and rails, are the highest structure of the embossed product. The prior art discloses that it is difficult to reverse mold and to emboss deep draws into a compressed wood fiber mat due to stretching and breaking of the fibers. Reverse molded fiberboard is stretched more on its visible outer surface than on its interior surface (surface in contact with a raised mold surface) making reverse molding much more difficult when attempting to provide sharp, crisp design detail in a raised panel that simulates natural wood millwork. As disclosed in the following U.S. patents, reverse molding and embossing deep draws into a fiberboard panel generally requires one or more of multiple press steps, post mold curing at elevated temperatures, a foil or high resin content outer surface portion, and/or high binder resin content of about 5-25%, preferably at least 10% by weight of the product: U.S. Pat. No. 4,061,813 Geimer; U.S. Pat. No. 4,378,265 Kiss; U.S. Pat. No. 4,552,797 Munk; U.S. Pat. No. 4,610,900 Nishibori; U.S. Pat. No. 4,612,224 Davis; 4,622,190 Schultz; U.S. Pat. No. 4,726,881 Schultz; U.S. Pat. No. 4,734,236 Davis; U.S. Pat. No. 4,812,188 Hansen; U.S. Pat. No. 4,844,968 Persson; U.S. Pat. No. 4,865,788 Davis; U.S. Pat. No. 4,960,548 Ikeda; U.S. Pat. No. 4,960,553 DeBruine; U.S. Pat. No. 4,969,302 Coggan; U.S. Pat. No. 5,028,374 Imao; U.S. Pat. No. 5,090,173 Coggan; U.S. Pat. No. 5,154,968 DePetris; U.S. Pat. No. 5,443,891 Bach; U.S. Pat. No. 5,851,325 Terada; U.S. Pat. No. 5,887,402 Ruggie.

The cellulosic fibers used to form the compressed mat, e.g., a one to two inch, preferably a ¾ to 1¾ inch thick layer of cellulosic fibers having a specific gravity (basis weight or pounds per square foot) of, for example, 0.6, initially may be bone dry after the fibers have been dried and felted, but the cellulosic fibers in such mats absorb moisture from the atmosphere and generally include about 2% to about 10% moisture when molded via hot pressing, depending upon the humidity in the region where such mats are stored and/or manufactured. The finished panels, after conditioning, have a moisture content of about 4½% to about 6½% by weight.

The reverse molded panels of the present invention are particularly suitable as wainscot panels and door skins, both for hollow core doors and as an added or plant-on feature to existing doors in order to enhance visual appearance. The panels are reverse molded to provide a "profile up" configuration. The reverse molding approach permits mounting the panel directly against a wall versus the prior art method requiring "shim spacers" (see FIG. 6A), thereby promoting easy installation while integrating excellent aesthetics of a wainscot panel. Historic treatments of real wood wainscot are well established and very expensive. Beyond the multiple piece millwork of real wood, some gypsum and polymeric materials have been fabricated into wainscot panels, but are marginally commercially acceptable, partly because they do not have the feel or look of natural wood. There are no wood fiber composite reverse molded wainscot systems available that provide the ease of application that is achieved in accordance with the principles of the present invention.

SUMMARY OF THE INVENTION

In brief, the present invention is directed to a reverse molded fiberboard panel, a wainscot kit comprising a plurality of differently sized reverse molded panels, and a planar finishing or spacer panel, adapted to completely cover any size wall between a wall base board and a wall chair rail; and a method of reverse molding a loose wood fiber mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture. The panels can include a foil, an impregnated paper overlay, or thermoplastic coating materials but do not require an overlay or high resin content coating to achieve excellent embossing fidelity and appearance.

Preferably, the loose wood fiber mat that is molded is manufactured by the dry process to provide a smooth, planar back surface surrounding the back surface of the raised, molded panels, rather than a screen back pattern which results from pressed mats made by the wet process. The reverse molded raised panel design provides a raised profile (profile up) that is sharp and crisp with sharp detail in exterior corners that has the appearance and feel of hand crafted natural wood millwork, but actually is a reverse-molded, high density wood composite material that can be adhesively secured to a planar surface, such as gypsum wallboard or a flat door surface.

Accordingly, one aspect of the present invention is to provide reverse molded, wood composite articles, and a method of manufacturing the articles, wherein the articles are molded from a loose mat of cellulosic fiber and binder, such that the articles have an upwardly raised panel that simulates natural wood millwork.

Another aspect of the present invention is to provide reverse molded, wood composite articles, and a method of manufacturing the articles, in kit form, such that the articles can be securely adhered to any planar surface, such as a gypsum wallboard, or plaster wall, to fill the entire wall area between a base board and a chair rail, while providing sharp, crisp exterior corners on the reverse molded, raised panel, to simulate natural wood, handcrafted millwork.

Another aspect of the present invention is to provide a wainscot kit comprising a plurality of reverse molded wood composite articles having different widths and a planar panel that can be easily cut to a desired width to fill an entire wall between a base board and a chair rail.

Still another aspect of the present invention is to provide a reverse molded wood composite article that provides exact transferring of mold detail at exterior corners and contours in a single pressing operation without requiring multiple press steps, post mold curing at elevated temperatures, machine routing, or a foil or a high resin content (10-25%) outer surface portion.

Another aspect of the present invention is to provide reverse molded wood composite articles that can be molded from cellulosic mats that do not require synthetic fibers, scrim surfaces, layering of short and long fibers, resin-impregnated paper overlays, thermoplastic varnishes, needling (needle punching), or perforating with an incising roll to hold the mat together prior to molding.

A further aspect of the present invention is to provide a reverse molded wood composite article that has one or more raised panels including a centrally disposed rectangular panel portion of 5-10 mm in height, surrounded by a raised, molded, contoured millwork design having a plurality of raised, planar steps ascending upwardly and inwardly integral with rounded contours to a rounded top portion that has reduced caliper at a rounded apex, to prevent damage and surface fiber fractures, and has a geometry such that sharp, crisp surface detail is provided, particularly at exterior corners of the millwork geometry, in a single pressing (molding) step, while providing substantially uniform density in all but localized areas, such as the rounded apex and corners of the raised, molded rectangular millwork design.

Another aspect of the present invention is to provide a reverse molded wood composite article that can be molded in a strip of multiple parts in a single pressing (molding) operation and can be cut into separate parts after molding and then coated with a water based and/or solvent-based coating material, e.g., paint or stain.

Still another aspect of the present invention is to provide a wainscot kit that includes a plurality of reverse molded wood composite articles to provide at least two differing raised panel (window) sizes, at least two different composite article widths, wherein a smaller width composite article has a proportionately smaller raised panel width, and a planar spacer panel, so that the combination of composite articles can completely fill a wall between a base board and a chair rail by cutting the planar spacer panel to size at inside wall corners for covering the full wall width up to the chair rail. More particularly, the preferred reverse molded articles in the kit are provided in widths of 12 inches, 16 inches and 48 inches with the 12 inch and 16 inch widths having windows (raised panels) of different sizes; and the 48 inch wide article having three windows of a size to match either the 12 inch wide or 16 inch wide article.

Another aspect of the present invention is to provide a reverse molded wood composite article that has one or more raised panels comprising a central, planar raised portion surrounded by a rectangular raised millwork design, the raised panels being surrounded by planar stiles and rails wherein the raised panels are capable of being separated from the surrounding planar stiles and rails, e.g., via sawing or back sanding, from the surrounding planar base so that the separated panels can be adhered to a household door, cabinet door, shutters, furniture, library or millwork walls, or as a framing material by further removing the central planar raised panel portion.

Another aspect of the present invention is to provide a reverse molded wood composite door skin comprising a molded wood composite panel having a first surface adapted to be exteriorly disposed and an opposite second surface adapted to be interiorly disposed in order to be adhesively secured to a surface, such as of a door frame or to the surface of an existing door. The panel comprises a major planar portion, at least one planar panel portion lying in a plane spaced from the plane of the major planar portion, and an outwardly extending contoured wall surrounding the planar panel portion. The contoured wall interconnects and is integral with the major planar portion and the planar panel portion, and extends outwardly from and relative to the first surface.

Another aspect of the present invention is to provide a door comprising first and second door skins. Each door skin has a first inner surface secured to a door support and a second exteriorly disposed surface, and at least one of the door skins has a major planar portion and at least one planar panel portion lying in a plane spaced from the plane of the major planar portion, and an outwardly extending contoured wall surrounding the planar panel portion. The contoured wall interconnects and is integral with the major planar portion and the planar panel portion, and extends outwardly from and relative to the first surface.

The above and other aspects and advantages of the present invention will become more apparent from the following detailed description of the preferred embodiments, taken in conjunction with the drawings.

BRIEF DESCRIPTION OF THE DRAWINGS

FIG. 3 is a front view of the components of a wainscot kit comprising four different articles—three reverse molded panels and one planar panel—capable of completely filling a wall between a base board and a chair rail while only cutting the planar panel to size to fill the entire wall up to the chair rail;

FIG. 4 is a partially broken-away front view of a portion of a wall containing an oversized window, showing one way to fit the kit of FIG. 3 onto a wall having an oversized window;

BRIEF DESCRIPTION OF THE PREFERRED EMBODIMENTS

Figure 2:
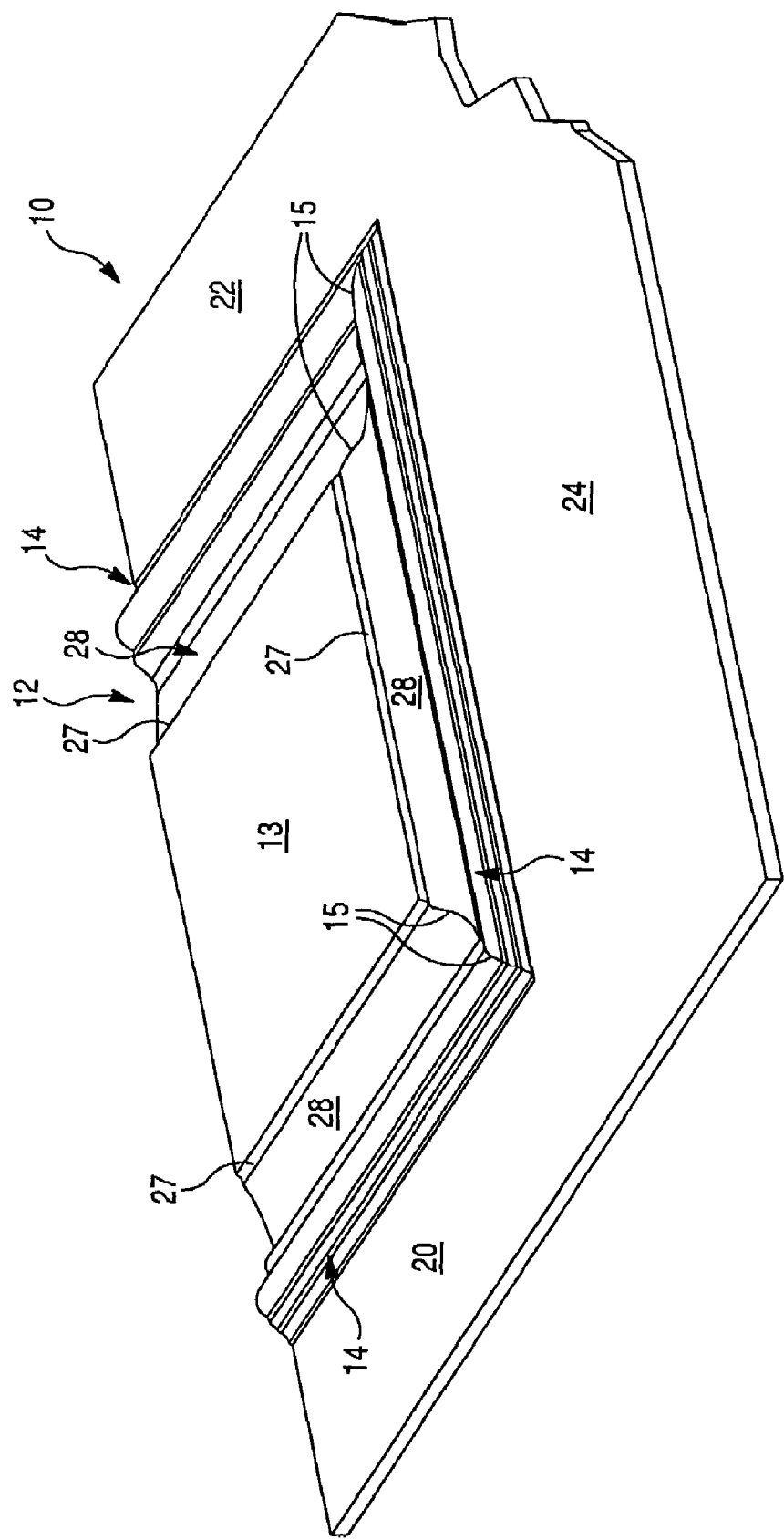
FIG. 2 is a partially broken-away perspective view of the reverse molded wainscot wood composite article of the present invention showing the preferred geometry of the raised panels.

In the preferred embodiment shown in the drawings, the molded wood composite articles of the present invention are molded in the form of wainscot paneling to be adhered to a planar interior wall between a wall base board and a wall chair rail, to simulate solid, natural wood wainscot millwork, as shown in FIG. 2. It should be understood, however, that the principles of the present invention apply to much more than the manufacture of wainscot and also applies to the manufacture of doors or door skins, particularly cabinet and entry door facings, as well as any molded, man-made composite wood article that includes one or more reverse-molded raised millwork designs adjacent to a planar surface portion of the molded article. Examples of other composite, reverse-molded wood articles that are capable of being manufactured in accordance with the principles of the present invention include decorative hardboard; interior and exterior passage door skins, cabinet door skins, garage door skins, and entry door skins; decorative interior wall paneling; cabinetry and furniture surface moldings; molded panels separated from their surrounding planar portions to be adhered to an outer planar surface of a cabinet, cabinet doors, entry doors or planar furniture portion; furniture components; and the like.

The dimensions of the reverse molded composite articles of the present invention preferably vary from 5 inches to 96 inches in width and from 12 inches to 60 inches or even 96 inches in height.

The articles of the present invention preferably are formed from at least 80% by weight fibrillated cellulosic fibers, based on the total, dry weight of fibers in the articles, and a binder capable of adhering the cellulosic fibers together into a structurally stable, consolidated article. The cellulosic fibers are in the form of refined, fibrillated fibers and can be molded and adhered together with natural or synthetic binders to provide aesthetically pleasing molded contours, and smooth or wood grain texture surfaces in all exterior, visible surfaces, including the molded, raised panel surfaces. Preferably the binder is present in an amount of about 3% to about 4% by weight when the molded panel is thereafter to be treated with linseed oil, and about 6% to about 8% by weight resin when there is no linseed oil treatment. Preferably the binder is a thermosetting binder selected from the group consisting of formaldehyde, melamine formaldehyde, phenol formaldehyde, urea formaldehyde, and methyl diisocyanate (MDI).

The articles of the present invention can be molded as a thin, e.g., 0.08 to 0.3 inch wainscot, or raised panels can be cut or back sanded to remove the raised panels for adherence to a cabinet door or the like to provide a raised, hand-crafted, natural wood millwork look onto any planar surface.

In accordance with the present invention, the reverse molded articles of the present invention can be adhesively applied or otherwise fastened to any planar support structure.

Figure 1:
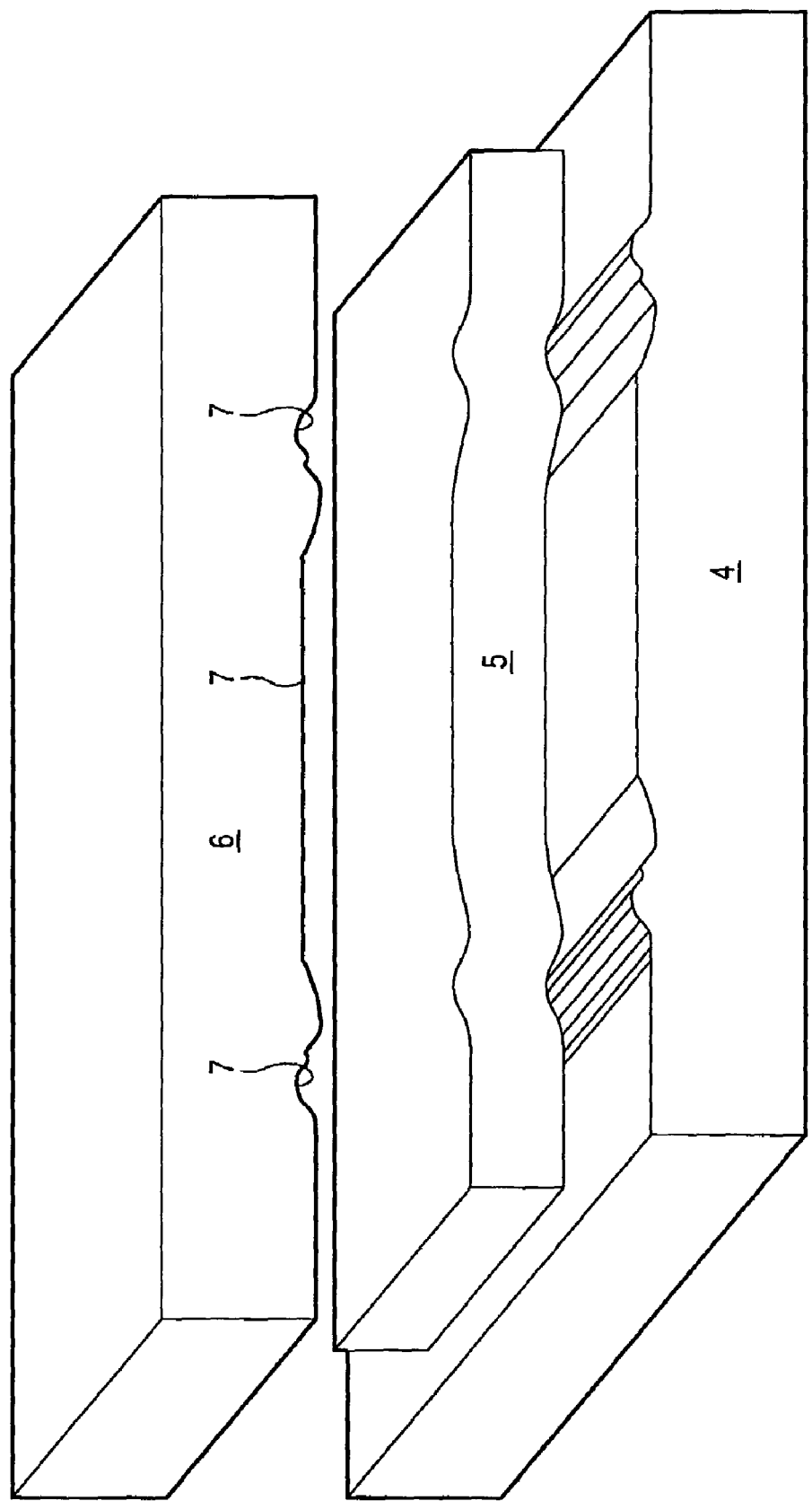
FIG. 1 is a partially broken-away perspective view of a slightly compressed wood fiber mat laid between a lower mold cavity and an upper mold core, showing the mat being loose enough to contour over the raised panel contours of the mold cavity prior to pressing.

Turning now to the drawings, and initially to FIG. 1, there is illustrated a partially broken-away perspective view of a portion of a mold, including a lower mold half or mold cavity 4, having a partially broken-away wood fiber mat 5 laid thereover, and an upper mold core 6, for pressing the mat 5 into a wainscot panel or door skin, generally designated by reference numeral 10. The upper mold core 6 has a mold depression 7 in its undersurface that is shaped complementary to the upwardly extending mold design shown in lower mold cavity 4 for pressing the mat 5 therebetween to conform to a mold cavity between the mold halves 4 and 6. The panel 10 is reverse molded, as shown in FIGS. 1 and 2, between the raised panel simulating lower mold cavity 4, and the upper mold core 6, to provide raised panels 12 in the molded article 10, including centrally disposed, planar raised panel portions 13, and rectangular contoured wall portions, generally designated by reference numeral 14, including raised exterior corners 15 on the panel outer surfaces that correspond to contours essentially identical to raised contours of the lower mold cavity 4. The reverse molded panel 10 can be secured, e.g., adhesively, or via fasteners, such as nails or screws, to a suitable planar surface, such as a wainscot wall area of an interior room. The lower mold cavity 4 is essentially the same in general contour as an upper surface of the wainscot panel 10, except that the lower mold cavity 4 would be slightly smaller horizontally, in the raised panel dimensions, to allow for the thickness of the molded cellulosic mat 5 that is molded to the upwardly extending raised panel design shown in FIG. 2. The upper mold core 6 carries a raised panel-receiving mold cavity 7 dimensioned complementary to the upper surface of the raised panel structure 12, and can be smoothly contoured or can include downwardly extending structure (not shown) to emboss simulated wood grain ticks that form a wood grain pattern.

Figure 5:
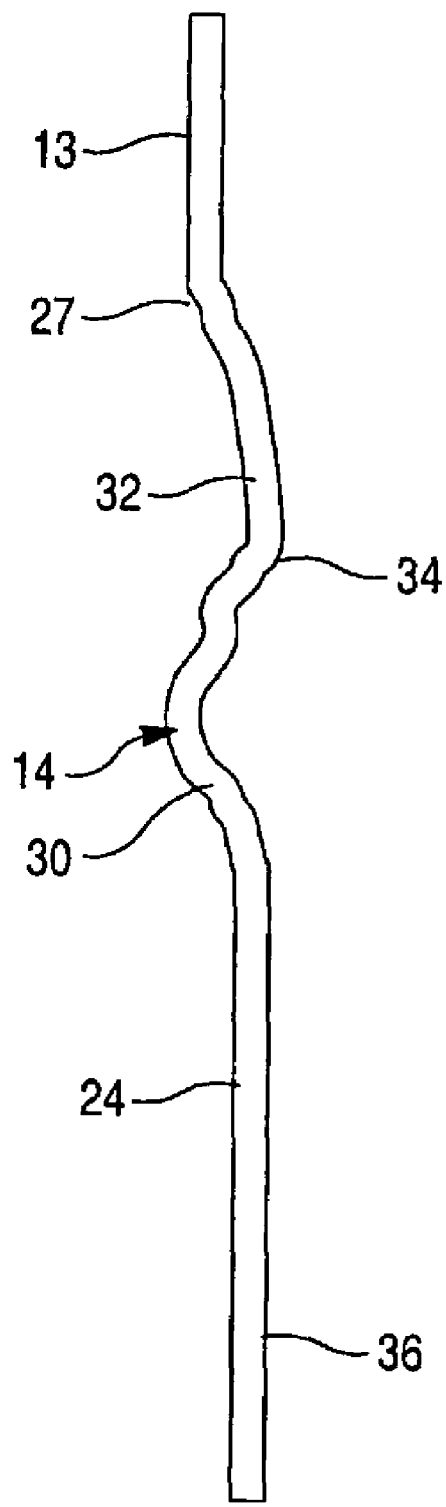
FIG. 5 is a partially broken-away side view of the reverse molded wood composite article of the present invention showing the profile of the reverse-molded raised panel design.
Figure 6A:
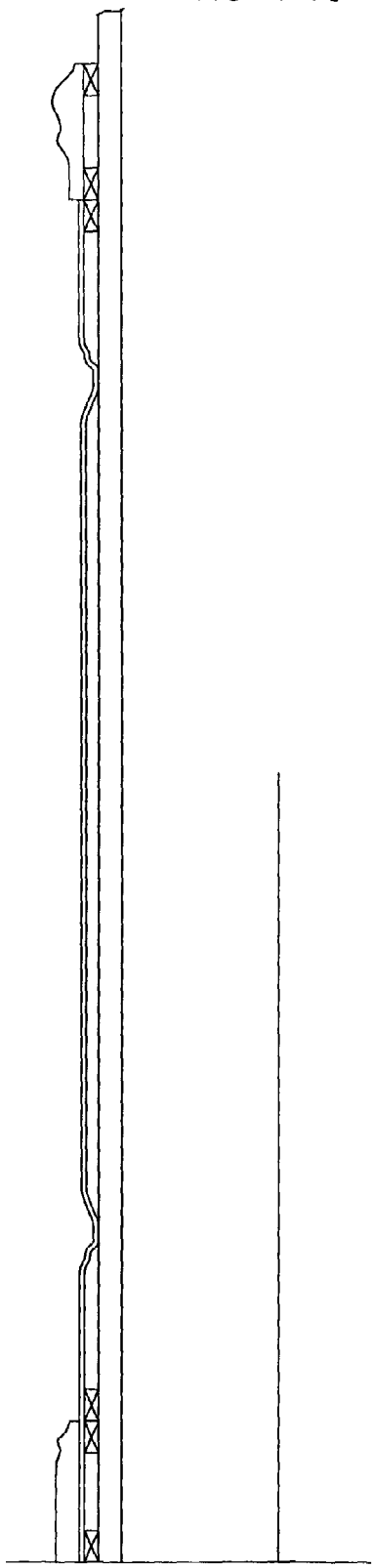
FIG. 6A is a side view, similar to FIG. 6, showing a prior art wainscot article secured to drywall with shim spacers.
Figure 6:
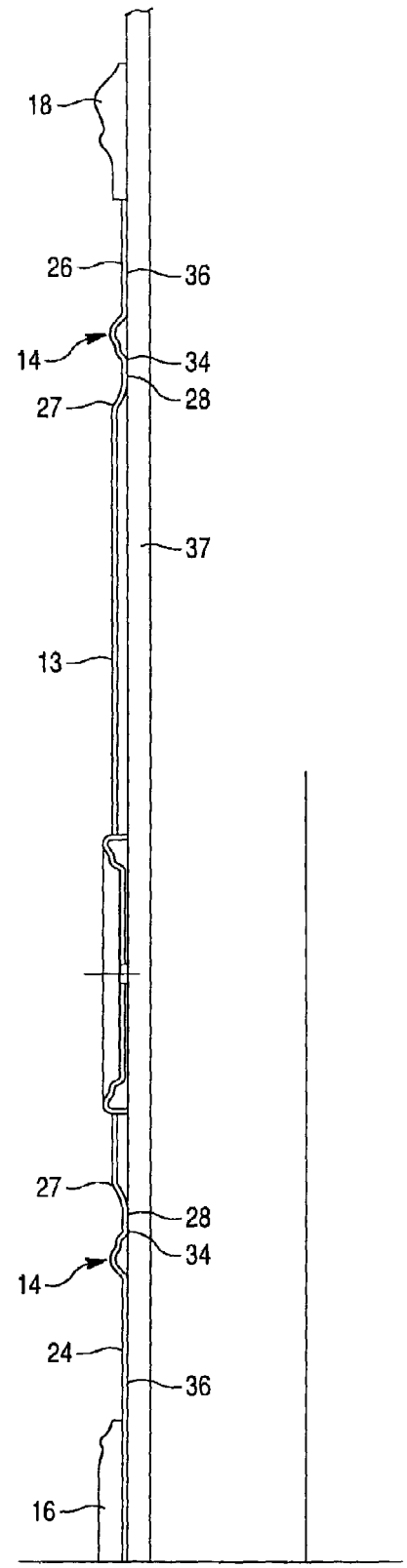
FIG. 6 is a side view of the wood composite wainscot article of the present invention adhered to drywall between a base board and a chair rail, taken along the line 6-6 of FIG. 7.

The wainscot panel 10 is molded with the mold cavity, disposed between die halves 4 and 6, disposed in a generally horizontal disposition so that the upper major surface will be described as horizontal—corresponding to its disposition during molding—and it will be recognized that the position of the molded article, in use, is usually intended to be vertical, instead of horizontal, as in the case of wainscot panel 10, as shown in FIGS. 2-7. The "raised profile up" molded outer major surface of the wainscot panels 10 is disposed in a vertical orientation ("raised profile out") between a wall base board 16 and a wall chair rail 18, as shown in FIG. 6. The exemplary wainscot panel 10, shown in FIG. 2, in the preferred embodiment, includes one or more of the raised panels 12, which are molded to provide contoured walls, generally designated by reference numeral 14, integral with and surrounding the centrally disposed planar raised panel portion 13, and the contoured walls 14 are integral with and surrounded by planar vertical stiles 20 and 22 and horizontal rails 24 and 26, respectively, lying in a common plane, for adhesive securement of an undersurface of each stile and rail 20, 22, 24 and 26 to a planar wall, as shown in FIGS. 3 and 6.

In the preferred wainscot panel 10, best shown in FIGS. 2-4, the reverse molded contoured walls 14 are molded in a rectangular shape, surrounding the centrally disposed planar panel portion 13, and the contoured walls 14 are interconnected to outer edges 27 of the planar panel portion 13 through sloping walls 28, disposed therebetween. As best shown in the panel profiles of FIGS. 5 and 6, the contoured walls 14 include a wall portion 30 that is integral with and extends upwardly from an adjacent stile or rail (24, as shown in FIG. 5) at an angle of about 25° to about 35° above horizontal (as molded in the horizontal position) relative to a center line. Wall portion 30 then is curved downwardly in a generally U-shaped contoured wall portion 32 integral at its outer end with wall portion 30, and integral at its inner end with the planar, raised panel portion 13, at outer edges 27 (FIGS. 2 and 5) of the planar, raised panel portion 13. Each of the four contoured walls 14 that forms the reverse molded rectangles of each raised panel 12 are of identical contour. In accordance with the preferred embodiment, U-shaped contoured wall portion 32 is contoured such that an innermost undersurface 34 (as applied against a wall) of the contoured wall portion 32, at the base of the U, lies in the same plane as an undersurface 36 of the stiles and rails 20, 22, 24 and 26, so that the undersurface 34 of U-shaped wall portion 32, at the base of the U, contacts, and can be adhered to, wall 37 for structural support when in position (as shown in FIG. 6).

The articles of the present invention are molded from a loose mat of cellulosic fibers and a thermosetting binder, such as a urea formaldehyde, melamine formaldehyde, and/or phenol formaldehyde binder commonly used in the manufacture of fiberboard. The mat should include at least about 80% fibrillated, refined cellulosic fibers, preferably 100%, based on the total, dry fiber weight in the mat 5. The fibers are mechanically refined from wood chips preferably using steam pressures in the range of about 80 to 120 psi, more preferably about 100 to 110 psi, most preferably about 105 psi. Steam pressures higher than about 120 psi in refining the cellulosic fibers produce highly refined fibers that are useful in accordance with the present invention, but the cost of refining would be commercially prohibitive.

Such refining of cellulosic fibers will provide fibrillated cellulosic fibers that are preferably dry laid into a loose wood fiber mat having a basis weight in the range of 0.58 to 0.62 pounds per square foot. Upon molding in a heated press at a temperature in the range of about 385° F. to 450° F., and at a maximum pressure in the range of about 550 to about 850 psi, the resulting embossed articles will have a specific gravity in the range of about 0.80 to about 1.10, preferably about 0.98 to about 1.06, more preferably about 1.00 to about 1.04. A uniform density may be substantially achieved through caliper adjustment as herein explained, although localized density differences may be present. Articles of the present invention that are "profile up" compensate to increase density and surface toughness by reducing caliper at the highest point in the design profile to about 1.02 to about 1.08 specific gravity, with a target of 1.02 to 1.04 specific gravity, whether smooth or textured. The flat surface geometry surrounding the profile zones is pressed to a slightly lower specific gravity of 1.00 to 0.98 by slightly increasing the caliper within these zones.

In accordance with another important embodiment of the present invention, the reverse molded panels 10 of the present invention can be produced in a plurality of widths, as shown in FIG. 3, for example, a molded panel 10A that is, for example, 48 inches wide, having three raised panels 12, a panel 10B that is, for example, 16 inches wide, having a single raised panel 12; a panel 10C that is, for example, 12 inches wide, having a single raised panel 12; and a planar panel 10D that is, for example, 8 inches wide, and can be cut easily lengthwise, to complete a wall. Each panel 10A, 10B, 10C and 10D is the same height of, for example, 32 inches—a standard wainscot height. As shown in FIG. 3, the panels, e.g., 10B or 10C, can be arranged under windows 40, by rotating the panel (10B, as shown in FIG. 3) 90° so that the raised panel 12 has its length in a horizontal disposition and, if necessary, when windows are lower to the floor, panel 10C can be used instead, together with one or two planar panels 10D above and/or below panel 10C.

The wainscot kit shown in FIG. 2 can be easily installed by the homeowner by starting at the center of the room, or directly under a center window, and arranging the panels symmetrically toward inside corners of the spaced wall ends. By arranging the panels 10B and/or 10C properly, the 8 inch width planar panels 10D will be of sufficient width to fill all walls, to the wall ends, defined at inside room corners, and can be cut accurately to completely fill the wall.

Figure 7:
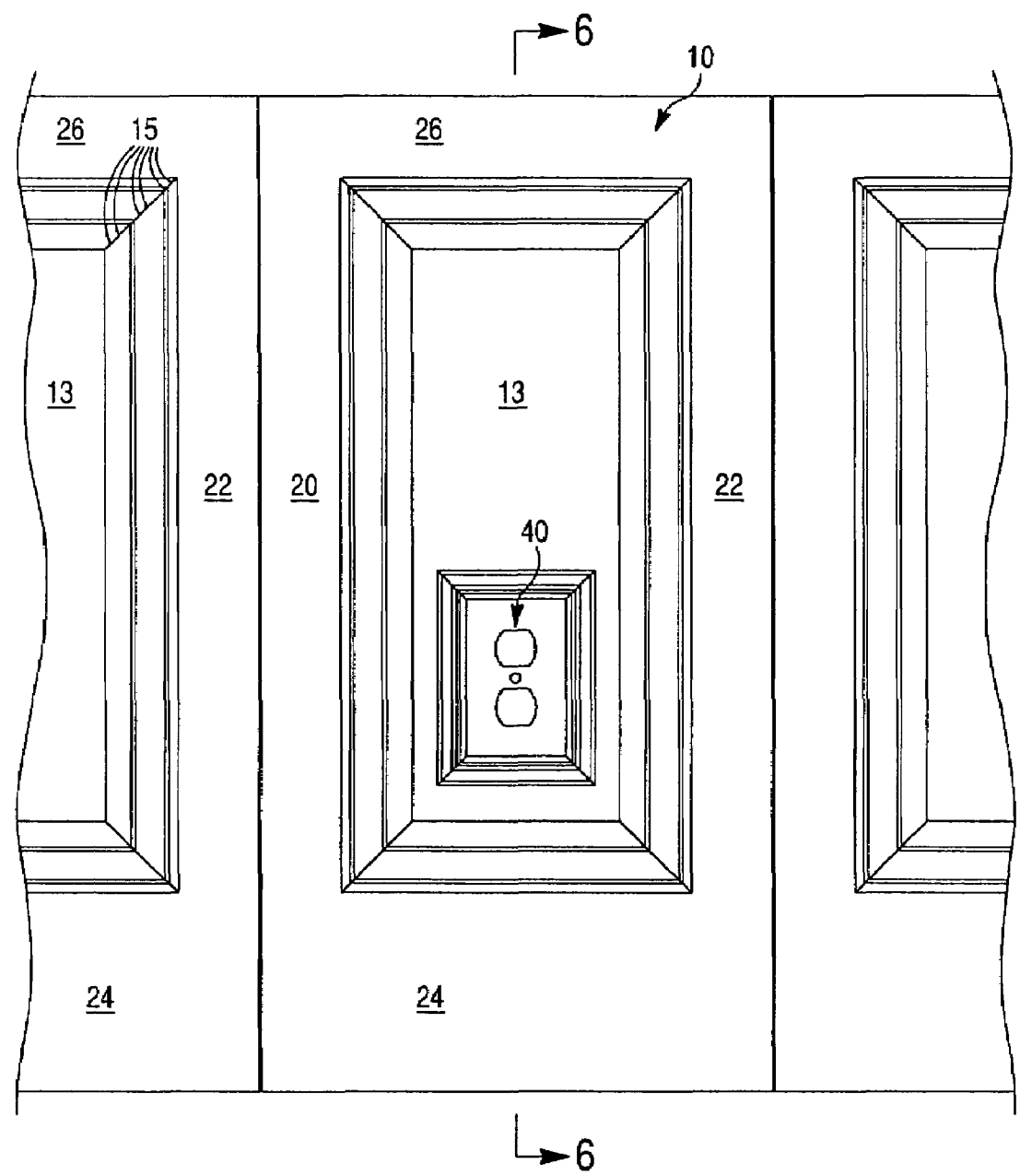
FIG. 7 is a front view of the wood composite wainscot article of the present invention secured to a wall and showing a new design for a switch plate that can be secured to the wall through the wainscot article, even if the electrical outlet falls within the raised panel design.

In accordance with another aspect of the present invention, electrical light switch plates (not shown) and outlet covers, generally and collectively referred to by reference numeral 40 (FIG. 7), are provided in the kit shown in FIG. 3. These outlet covers 40 and switch plates (not shown) are rectangular and have outermost vertical walls 42 that are at least as high as the raised contoured walls 14 and planar raised panel portions 13 of panels 12 so that wherever the light switch plates and/or electrical outlet covers 40 are positioned within the wainscot panels 10, a hole is cut in the panels 12 to the same outer dimensions as the switch plate cover or outlet cover 40, and the outlet cover 40 is inserted against the wall (within the panel), without exposing a cut panel, since the cuts in panel 12 will be flush against the outermost walls 42 of the outlet cover 40, as shown in FIG. 7.

Figure 8:
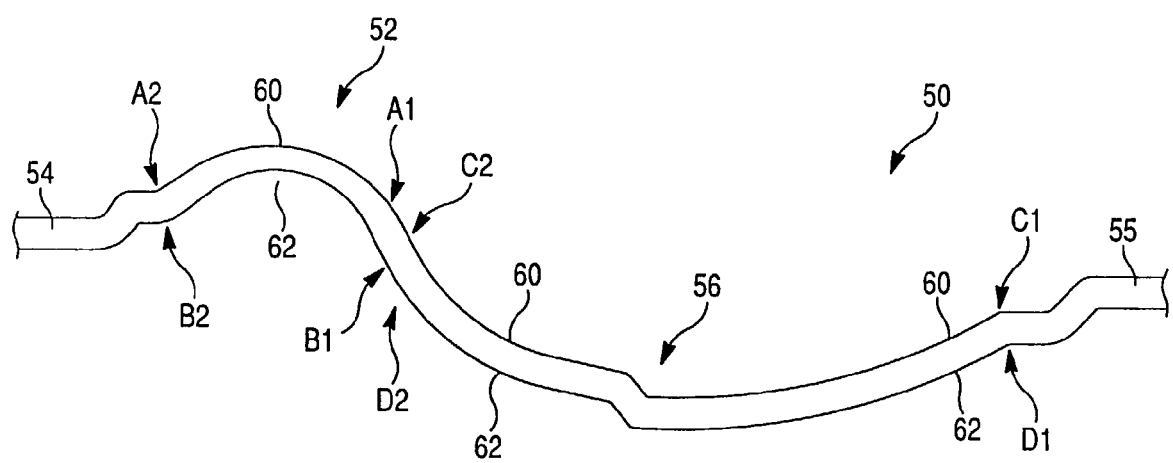
FIG. 8 is a fragmentary cross-sectional view of a reverse molded wood composite article of the present invention showing the profile of the reverse-molded raised panel design having molded portions above and below a major planar surface.
Figure 9:
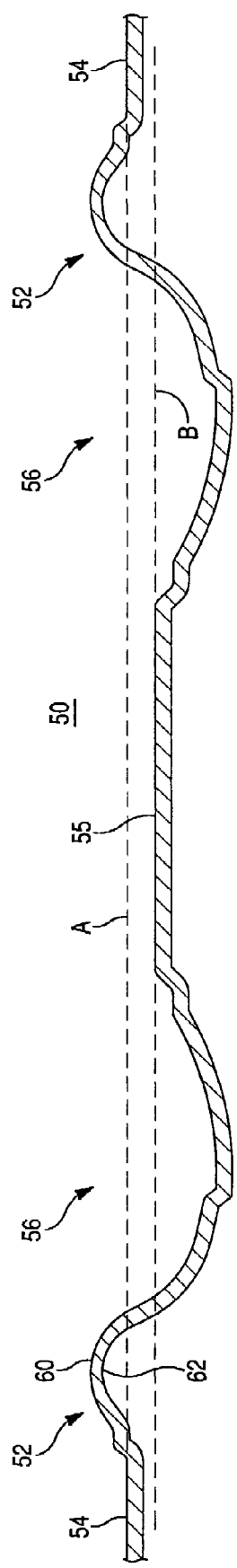
FIG. 9 is a fragmentary cross-sectional view of the reverse molded wood composite article of FIG. 8.
Figure 10:
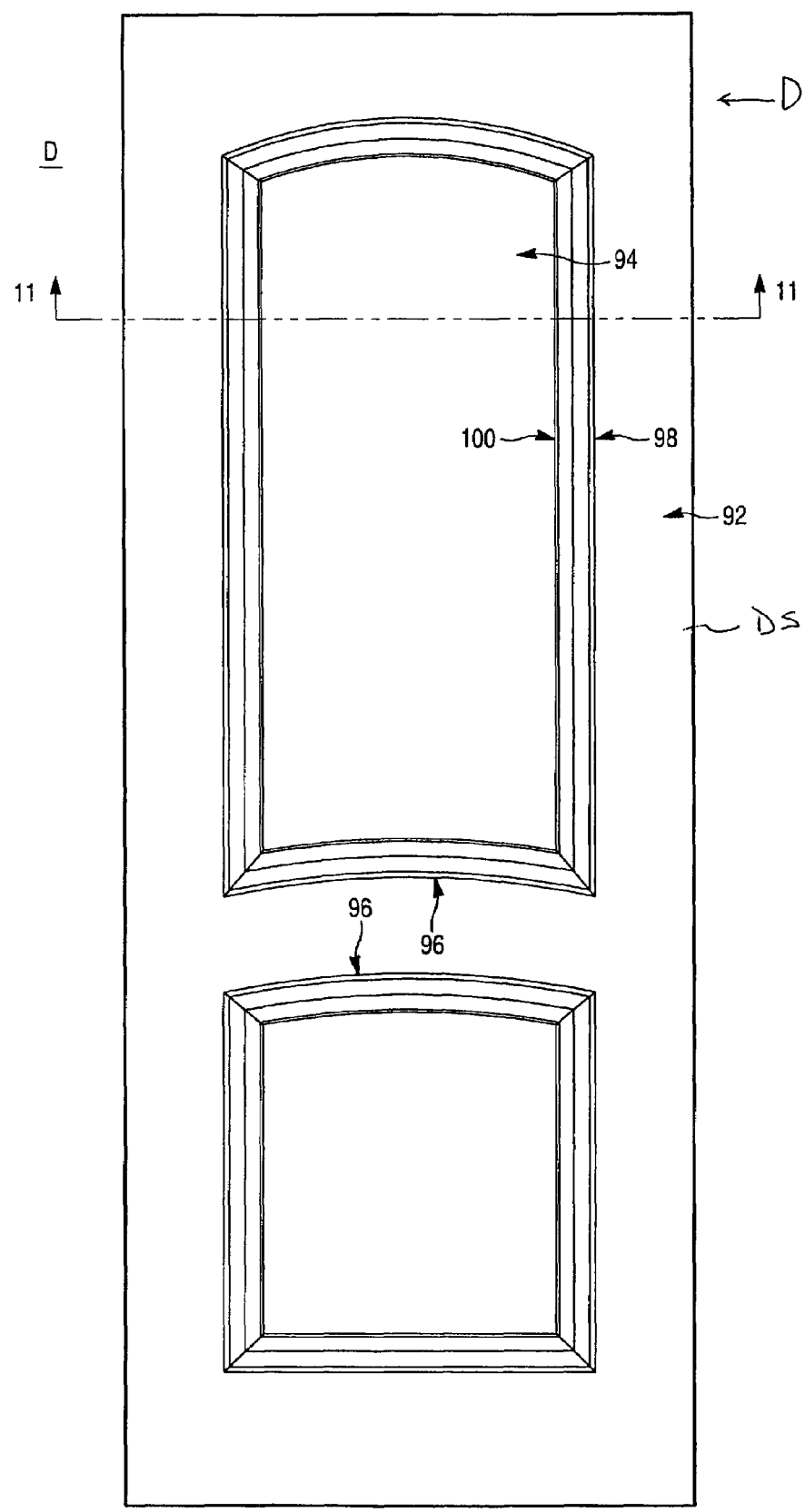
FIG. 10 is a front elevational view of a door according to the present invention.

As best shown in FIGS. 8-10, another aspect of the present invention provides a reverse molded door skin 50 having a first major planar portion 54 providing stile and rail portions for the door skin 50 and lying in a first plane A, at least one planar panel portion 55 lying in a plane B spaced from plane A of major planar portion 54, a contoured portion 52 extending outwardly relative to major planar portion 54, and a recessed portion 56 extending inwardly relative to major planar surface 54, as best shown in FIGS. 8-9. Upper surface 60 is adapted to be exteriorly disposed and has a desired visual appearance and hardness and porosity suitable to accept paint or other colorant. Inner unexposed surface 62 is adapted to be interiorly disposed in order to be adhesively secured to a surface of a door frame, door, or the like.

During the compression of the wood fiber mat, contoured portion 52 is compressed to have a curved profile, which extends outwardly relative to major planar surface 54. Recessed portion 56 is compressed to have a curved profile which extends inwardly relative to major planar surface 54. The cellulosic fibers in these curved portions do not "flow" during compression. Rather, they are stretched. The resultant surface length of a portion compressed to have a curved profile is longer due to stretching, as compared to if that same portion were compressed to have a flat profile. Similarly, the length of surface 60 at contour portion 52 has a length exceeding the length of surface 60 at contour portion 52.

Contour portion 52 has an inner surface and an outer surface; for example, the surface between points A1 and A2 on the outer surface of the curved, contoured portion 52. The surface between points B1 and B2 is the inner surface of contoured portion 52. Note that for recessed portion 56, the surface between points D1 and D2 is the outer surface of the curved portion, and between C1 and C2 is the inner surface of the curved portion. The length of the inner surface of a curved portion is less than the length of the outer surface of the curved portion. Furthermore, the difference in length between the outer surface versus the corresponding inner surface of a curved portion, or length ratio, increases as the severity and angle of curvature (relative to the major planar portion) increases.

As best shown in FIG. 8, the distance between A1 and A2 along the outer surface of contoured portion 52 is 0.787 inches. The length of the corresponding inner surface between B1 and B2 is 0.556 inches. The length between A1 and A2 is 41.5% longer than the length between B1 to B2. This reflects an increase of 41.5% length of visible surface 60 compared to unexposed surface 62 (0.787"/0.556=41.5%) of contoured portion 52 resulting from the reverse compression molding operation.

Figure 14:
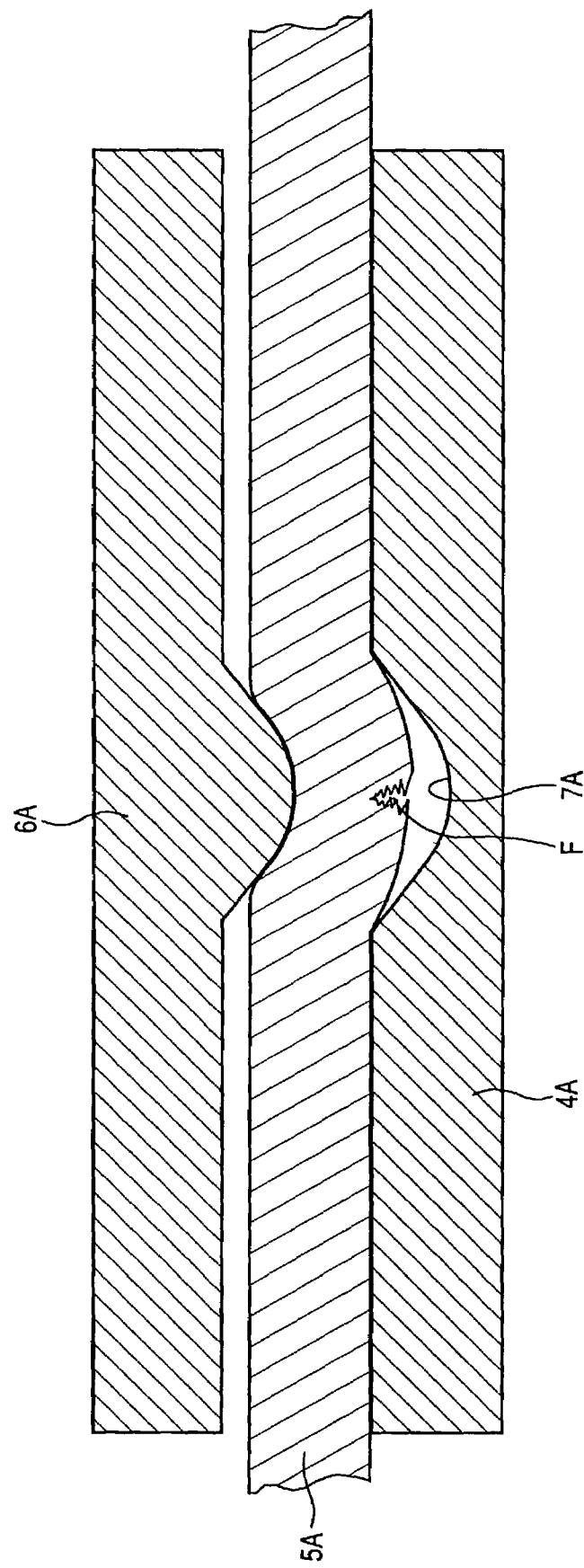
FIG. 14 a fragmentary cross-sectional view of a wood fiber mat disposed between upper and lower mold cores, showing fracturing of the wood fiber mat during compression.
Figure 15:
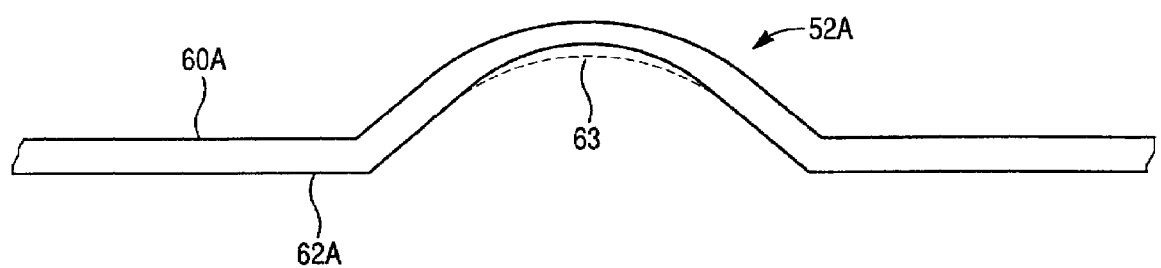
FIG. 15 is a fragmentary cross-sectional view of a reverse molded composite article according to the present invention, showing caliper adjustment at a contoured portion of the article.

The stretching of cellulosic fibers during the compression of the wood fiber mat is most prevalent on an outer surface of a curved portion, resulting in an increased length ratio. Cellulosic fibers are stretched and pulled as the length ratio increases, which results in decreased density and possibly surface fracturing, as best shown in FIG. 14. This, in turn, may lead to unsatisfactory surface hardness and poor paintability. The invention avoids these problems by adjusting the caliper, as best shown in FIG. 15.

Conventional fiberboard molding processes provide adequate surface hardness and paintability for compressed articles having recessed design portions, because the results of fiber stretch are positioned so as to not be visible. The intended visible surface of a conventional recessed design portion undergoes less stretch than the intended non-visible surface as explained above. Generally, in conventional fiberboard recessed molding, the compaction of the cellulosic fibers causes fracturing to occur on the outer surface of a recessed design portion due to stretching of the fibers. However, the fibers from above the fractured areas are packed inwardly toward the fractured areas during compression, which tend to be at the most recessed point of the curved portion relative to the major planar surface. This inward packing of the fibers in conventional fiberboard molding tends to heal the fractured area enough to provide structural integrity to the design portion, while also providing an adequate surface hardness and paintability for the corresponding inner surface of the design portion. The surface quality of the outer surface of the design portion of a recessed portion is not of significance, because the outer surface is not intended to be exposed. Therefore, length ratio considerations for the outer surface of a curved portion in a conventional fiberboard recess molded article are not important. Instead, the principal consideration is uniform density throughout the article.

The reverse molding process of the present invention utilizes caliper adjustments in order to achieve an acceptable reverse molded profile with outwardly extending contoured portions and outer curved surfaces of the contoured portions as the intended visible surface. Therefore, the length ratio of such contoured portions requires that the stretch and density effects be taken into account. By adjusting the caliper at various locations, an acceptable surface is achieved within the required hardness and porosity parameters. The invention prevents cracking or fracturing and blistering through caliper control of density, while achieving desired aesthetics and integrity.

The present invention provides for an adjustment in caliper in response to length ratio and stretching factors affecting outwardly extending portions of the contoured portion. The caliper is adjusted to achieve excellent surface hardness and paintability of an article. In this way, compression of portions that are subject to fracturing is resolved to effectively re-mend the visible surface of an outwardly extending design portion.

During the reverse molding operation, upper and lower mold cores 4 and 6 of FIG. 1 stretch the cellulosic fibers in wood fiber mat 5 at points corresponding to mold cavity 7. During compression, stretching is maximized at points corresponding to the outer surface of the outwardly extending design portion being formed in mold cavity 7. This stretching results in fracturing and fiber separation due to the angle of force in reverse molding, as well as the downward force of gravity during compression. The corresponding inner surface of the contour portion maintains surface integrity, because the effects of stretching are not as severe and the fibers are packed downward on this inner surface.

FIG. 14 illustrates upper and lower mold cores 6A and 4A, respectively, and wood fiber mat 5A during compression of the wood fiber mat. As shown in FIG. 14, the die surfaces are complementary, so that the resulting caliper would be uniform. As explained above, uniform caliper can cause fractures F, which are substantially mended during conventional molding where the fractured surface would not be intended to be the exposed surface.

In a reverse molded, profile out design as herein disclosed, the inner surface is the unexposed surface. As best shown in FIG. 14, upper and lower mold cores 6A and 4A stretch and fracture the cellulosic fibers in cellulosic mat 5A at points corresponding to mold cavity 7A during compression. As noted above, this fractured area corresponds to an outer surface 60A of a curved portion 52A, which is the exposed surface. In order to mend and eliminate the fractured areas on the outer surface, the outwardly extending portion is "pinched" in order to reduce caliper and achieve a desired density, as best shown in FIG. 15. The reduced caliper creates a zone of overcompression of the outwardly extending portion 52A, which re-mends the visible surface 60A. In addition, the reduced caliper at outwardly extending portion 52A prevents blistering, and achieves a hardened surface that is able to handle additional abuse on or around the protruding, outwardly extending portion 52A. Caliper is reduced at outwardly extending portion 52A, compared to a uniform caliper shown with a dashed line 63 extending from unexposed surface 62A.

With reference to FIG. 8, molded panel 50 has a thickness of X caliper at major planar surface 54. As explained above, the length of exposed surface 60 between points A1 and A2 is increased by 41.5% during compression, compared to the corresponding distance between points B1-B2. In order to achieve the desired surface qualities of visible surface 60, the caliper of above planar contoured portion 52 is reduced by about 12% to about 28%. An increase in length ratio of 15-75% is correlated to a decrease in caliper by 12-28%. Caliper is reduced as a means to effectively harden the surface at the contoured portion, thereby achieving excellent surface hardness and paintability.

As noted above, the molded panel 50, which may be a door skin, comprises a first major planar portion 54 lying in a first plane, and at least one planar panel portion 55 lying in a plane spaced from the plane of major planar portion 54. As best shown in FIG. 9, planar panel portion 55 is recessed relative to first major planar portion 54. Contoured portion 52 extends outwardly from major planar portion 54. Recessed portion 56 extends inwardly and is interposed between contoured portion 52 and planar panel portion 55. Recessed portion 56 is recessed relative to both major planar portion 54 and planar panel portion 55.

As best shown in FIG. 9, molded panel 50 has two reference planes A and B, shown as two parallel dashed lines. Major planar portion 54 lies on reference plane A. Planar panel portion 55 lies on reference plane B. The spacing between reference planes A and B may be adjusted as desired, so long as the caliper of contoured portion 52 and recessed portion 56 are appropriately adjusted as explained above.

As best shown in FIG. 10, another aspect of the present invention provides for a door D having a door skin DS with a reverse molded, outwardly extending portion. Door skin DS preferably is manufactured from hardboard. Door D comprises a stile and rail wooden frame to which first and second door skins DS are adhesively secured. At least one of the door skins DS is formed according to the reverse molded process disclosed above and has the resulting reverse molded "profile up" appearance. Preferably there are two like, symmetrical door skins DS for door D. Specifically, door skins DS each comprises a major planar surface 92 and at least one planar panel portion 94. As shown in FIG. 10, door skin DS has two planar panel portions 94. Preferably, planar panel portions 94 are surrounded by contoured wall 96. Contoured wall 96 extends outwardly relative to major planar surface 92. It is understood that door skins DS may have any number of planar panel portions as desired. Furthermore, planar panel portions 94 and contoured walls 96 may be any desired shape or configuration.

Contoured wall 96 comprises a first portion 98 adjacent major planar surface 92, and a second portion 100 adjacent planar panel portion 94. First portion 98 outwardly extends relative to major planar surface 92. Second portion 100 is inwardly recessed relative to major planar surface 92. In addition, second portion is recessed relative to planar panel portion 94. Thus, planar panel portion 94 is similar to door skin 50 described above, in that door skin DS includes a major planar 92 surface lying on a first plane and planar panel portions 94 lying on plane spaced from the plane of major planar surface 92.

Figure 11:
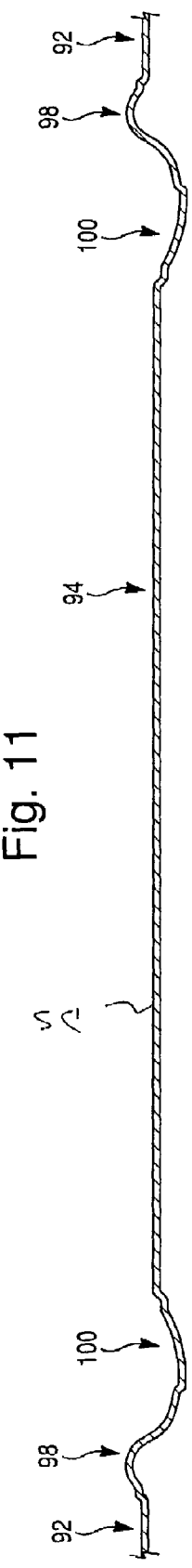
FIG. 11 is a cross-sectional view of a door skin of the door of FIG. 10 taken along the line 11-11 and viewed in the direction of the arrows.

Door skin DS, as best shown in FIG. 11, includes a major planar surface 92 on a first plane, and planar panel portions 94 lying on a plane spaced from the plane of major planar surface 92. Planar panel portions 94 are recessed relative to major planar surface 92. First portion 98 of contoured wall 96 extends outwardly relative to major planar surface 92, and second portion 100 extends inwardly relative to both planar panel portions 94 and major planar surface 92. As can be seen from FIG. 11, door skin DS has a contoured profile which has a first portion 98 extending outwardly and upwardly above the major planar surface 92 and a second integral portion 100 extending inwardly and downwardly relative to major planar surface 92. While we disclose the second portion 100 as being proximate panel portion 94 and first portion 98 as being proximate major planar surface 92, the positioning could be reversed for aesthetic or other reasons. Moreover, while we disclose first portion 98 as having a rounded apex, it could have some other aesthetically desirable shape. Similarly, second portion 100 need not be arc-shaped. Also, some other or third integral portion could be interposed between first portion 98 and second portion 100.

Figure 12:
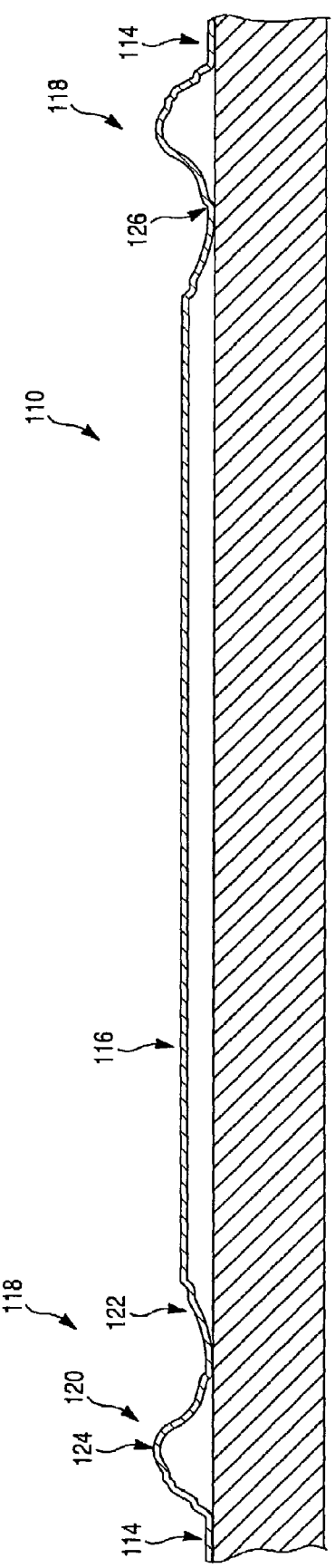
FIG. 12 is a fragmentary cross-sectional view of a door according to another embodiment of the present invention.

As best shown in FIG. 12, another aspect of the present invention provides a reverse molded plant-on door skin 110 for being secured to a door D1 having a planar surface 112. Door skin 110 comprises a major planar portion 114 lying on a first plane, and a panel portion 116 lying on a plane outwardly spaced from the plane of major planar portion 114. A contoured portion 118 is interposed between major planar portion 114 and panel portion 116. Contoured portion 118 has a first portion 120 adjacent major planar portion 114, and a second portion 122 adjacent panel portion 116. First portion 120 preferably has a rounded apex 124 extending outwardly relative to both major planar portion 114 and panel portion 116. Second portion 122 of contoured portion 118 extends inwardly relative to panel portion 116. Preferably, second portion 122 has a base 126 lying on a plane with major planar portion 114, as shown in FIG. 12. In this way, major planar surface 114 and base 126 lie on a plane that may be securely adhered to planar surface 112 of door D1. In this way, a contoured door skin may be easily secured to a door having a planar, unadorned surface. Thus, a contoured door is created without the cost and labor of replacing the old door.

Figure 13:
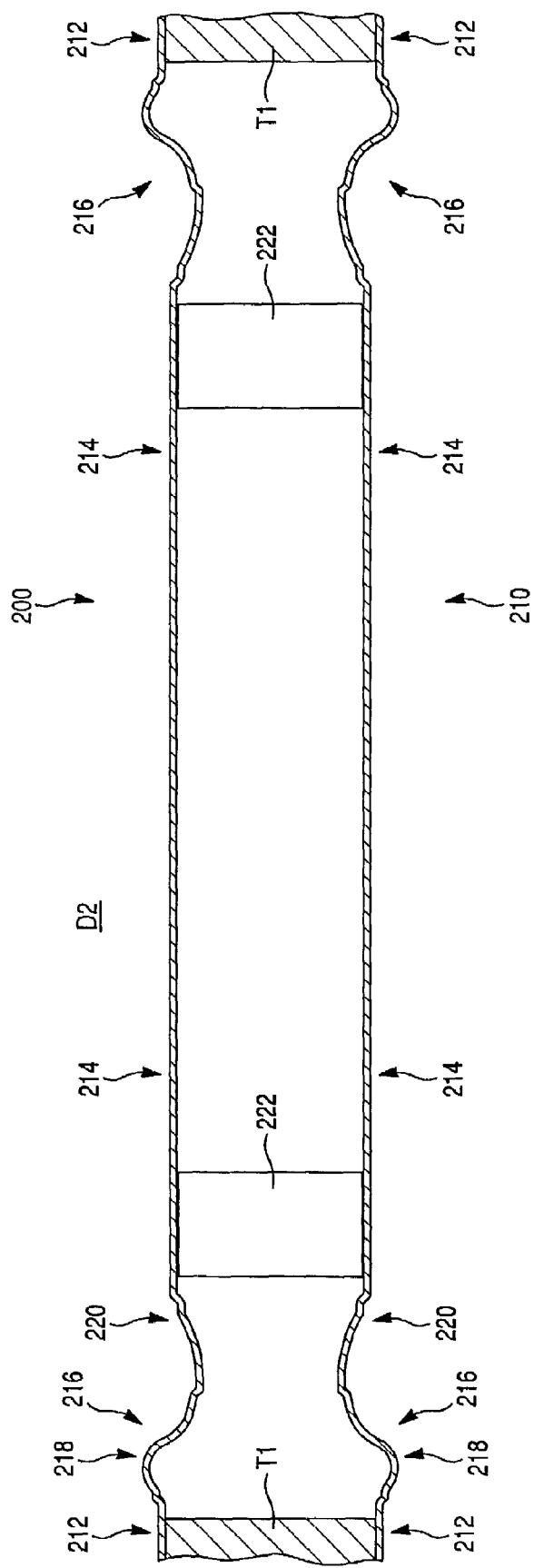
FIG. 13. is a fragmentary cross-sectional view of a door according to yet another embodiment of the present invention.

As best shown in FIG. 13, another aspect of the present invention provides a door D2 having first and second like, symmetrical door skins, each with a reverse molded, outwardly extending portion. Door D2 comprises a stile and rail wooden frame F to which first and second door skins 200 and 210, respectively, are adhesively secured. As best shown in FIG. 13, both of door skins 200 and 210 are formed according to the reverse molded process disclosed above, having a reverse molded "profile up" appearance. However, it is understood that one of door skins 200 and 210 may be formed with a planar surface or with conventional recessed designs relative to a major planar surface. Each one of door skins 200 and 210 comprise a major planar surface 212 and at least one planar panel portion 214. Each of the skins 200 and 210 may be the door skin DS of FIGS. 10 and 11. A contoured portion 216 extends outwardly relative to major planar surface 212, and includes a first portion 218 adjacent major planar surface 212 and a second portion 220 adjacent planar panel portion 214. Door D2 further comprises spacers 222 adhesively secured between planar panel portions 214 of first and second door skins 200 and 210, as best shown in FIG. 13. Spacers 222 provide weight, strength and support to door D2, so it more accurately simulates a solid wood door having a panel design. A front view of door D2 appears identical to door D shown in FIG. 10, given the exteriorly disposed surface of skins 200 and 210 are identical to skins shown in FIG. 11. Therefore, skins 200 and 210 may include any number of planar panel portions 214, which are preferably rectangular. Spacers 222 are preferably manufactured from softboard, cardboard, or similar material. Certain aspects of the disclosed invention have been explained according to preferred embodiments. However, it will be apparent to one of ordinary skill in the art that various modifications and variations can be made in construction or configuration of the present invention without departing from the scope or spirit of the invention. Thus, it is intended that the present invention cover all modifications and variations of the invention, provided they come within the scope of the following claims and their equivalents.

What is claimed is:

1. A reverse molded wood composite door skin, comprising:
   a molded wood composite panel having a first surface adapted to be exteriorly disposed and an opposite second surface adapted to be interiorly disposed in order to be adhesively secured to a surface, the panel comprising a major planar portion living on a first plane, at least one planar panel portion lying on a second plane spaced from said first plane, and an outwardly extending contoured wall surrounding said planar panel portion and interconnecting and integral with said major planar portion and said planar panel portion, said contoured wall extending outwardly from and relative to said first surface, wherein said contoured wall includes a first contoured portion adjacent said major planar portion and extending outwardly to an apex relative to said first plane and a second contoured portion adjacent said planar panel portion and extending inwardly relative to said second plane, wherein said major planar portion has a first caliper and said contonred wall has a second caliper less than said first caliper and decreasing toward said apex.

2. The door skin of claim 1, wherein said apex includes a rounded top.

3. The door skin of claim 2, wherein said contoured wall further comprises a plurality of raised planar steps interposed between said first major planar portion and said rounded top.

4. The door skin of claim 2, wherein said rounded top has at least a portion disposed outwardly beyond said major planar portion and said planar panel portion.

5. The door skin of claim 1, wherein said raised planar panel portion is inwardly disposed relative to said major planar portion.

6. The door skin of claim 1, wherein said contoured wall extends outwardly from said first surface at an angle of about 25° to about 35°.

7. The door skin of claim 6, wherein said contoured wall is rectangular in plan.

8. The door skin of claim 1, wherein each one of said one planar panel portions is rectangular.

9. The door skin of claim 1, wherein said planar panel portion is disposed inwardly from said first major surface.

10. The door skin of claim 1, wherein said panel is formed from at least forty percent by weight wood fiber selected from the group consisting of pine and fir.

11. The door skin of claim 1, wherein said panel is formed of hardboard.

12. A reverse molded wood composite panel, comprising:
    a major planar portion having a first surface adapted to be exteriorly disposed and an. opposite second surface adapted to be interiorly disposed in order to be adhesively secured to a surface, a major planar portion having a first caliper, a planar panel portion lying in a plane spaced from the plane of said major planar portion, and a contoured portion extending outwardly from and relative to said first surface and interconnecting and integral with said major planar portion and said planar panel portion, said contoured portion having a second caliper of between about 12% to about 28% less than said first caliper, wherein said contoured portion includes a first contoured portion adjacent said major planar portion and extending outwardly from said first surface to an apex and a second contoured portion adjacent said planar panel portion and extending inwardly relative to said first surface, said second caliper decreasing toward said apex.

13. The reverse molded panel of claim 12, wherein said contoured portion includes a rounded top portion.

14. The reverse molded panel of claim 13, wherein said planar panel portion is disposed inwardly relative to said major planar portion.

15. The reverse molded panel of claim 13, wherein said planar panel portion is disposed outwardly relative to said major planar portion.

16. A door, comprising:
    first and second door skins, each door skin having a first inner surface secured to a door support and a second exteriorly disposed surface, at least one of said door skins having a major planar portion and at least one planar panel portion lying in a plane spaced from the plane of said major planar portion, and an outwardly extending contoured wall surrounding said planar panel portion and interconnecting and integral with said major planar portion and said planar panel portion, said contoured wall including a first contoured portion adjacent said major planar portion and extending outwardly from and relative to said first surface to an apex and a second contoured portion adjacent said planar panel portion and extending inwardly from and relative to said first surface, wherein said major planar portion has a first caliper and said contoured wall has a second caliper, said second caliper is less than said first caliper and decreasing toward said apex.

17. The door of claim 16, wherein said planar panel portion is disposed outwardly relative to said major planar portion.

18. The door of claim 16, wherein said contoured wall includes a first portion including a rounded top proximate said major planar portion and a second portion proximate said panel portion.

19. A reverse molded wood composite door skin, comprising:
    a molded hardboard panel having a first surface adapted to be exteriorly disposed and an opposite second surface adapted to be interiorly disposed in order to be adhesively secured to a surface, the panel comprising a major planar portion, at least one planar panel portion, and an outwardly extending contoured wall surrounding said planar panel portion and interconnecting and integral with said major planar portion and said planar panel portion, said contoured wall including a first contoured portion adjacent said major planar portion and extending outwardly from and relative to said first surface to an apex and a second contoured portion adjacent said planar panel portion and extending inwardly from and relative to said first surface, wherein said major planar portion has a first caliper and said contoured wall has a second caliper less than said first caliper and decreasing toward said apex.

20. A reverse molded wood composite door skin, comprising:
    a molded wood composite panel having a first surface adapted to be exteriorly disposed and an opposite second surface adapted to be interiorly disposed in order to be adhesively secured to a surface, the panel containing up to about 8% by weight resin binder and comprising a major planar portion, at least one planar panel portion, and an outwardly extending contoured wall surrounding said planar panel portion and interconnecting and integral with said major planar portion and said planar panel portion, said contoured wall including a first contoured portion adjacent said major planar portion and extending outwardly from and relative to said first surface to an apex and a second contoured portion adjacent said planar panel portion and extending inwardly from and relative to said first surface, wherein said major planar portion has a first caliper and said contoured wall has a second caliper less than said first caliper and decreasing toward said apex.

21. A molded wood composite door skin, comprising:
an outer planar area having a first caliper;
an inner planar area; and
a contoured portion interconnecting and integral with said outer planar area and said inner planar area, said contoured portion including a convex portion having an apex and a concave portion, said convex portion having a second caliper less than said first caliper and decreasing toward said apex, wherein an exterior surface of said convex portion has a first surface length and an interior surface of said convex portion has a second surface length, said first surface length at least about 15% greater than said second surface length.

22. The wood composite door skin of claim 21, wherein said second caliper is at least about 12% less than said first caliper.

23. The wood composite door skin of claim 21, wherein said concave portion has a third caliper less than said first caliper.

24. The wood composite door skin of claim 23, wherein said third caliper is at least about 12% less than said first caliper.

25. The wood composite door skin of claim 21, wherein said convex portion is adjacent said outer planar area, and said concave portion is adjacent said inner planar area.

26. The wood composite door skin of claim 21, wherein said inner planar area is rectangular is plan.

27. The wood composite door skin of claim 21, wherein the door skin comprises a plurality of inner planar areas, each of said inner planar areas surrounded by and integral with a corresponding contoured portion.

28. The wood composite door skin of claim 21, wherein said convex portion subtends an angle of at least about 75°.

29. A molded wood composite door skin, comprising:
a molded wood composite panel having a first surface adapted to be exteriorly disposed and an opposite second surface adapted to be interiorly disposed in order to be secured to a surface, the panel comprising a major planar portion having a first caliper, at least one planar panel portion, and a contoured portion interconnecting and integral with said major planar portion and said planar panel portion, said contoured portion including a convex portion having an apex and a concave portion, said convex portion having a second caliper at least about 12% less than said first caliper and decreasing toward said apex, wherein an exterior surface of said convex portion has a first surface length and an interior surface of said convex portion has a second surface length, said first surface length at least about 15% greater than said second surface length.

30. A door, comprising:
a perimeter frame having first and second sides;
first and second molded wood composite door skins, each door skin having an interior surface secured to one of said sides and an exterior surface, at least one of said door skins having an outer planar area having a first caliper, an inner planar area, and a contoured portion interconnecting and integral with said outer planar area and said inner planar area, said contoured portion including a convex portion having an apex and a concave portion, said convex portion having a second caliper less than said first caliper and decreasing toward said apex, wherein an exterior surface of said convex portion has a first surface length and an interior surface of said convex portion has a second surface length, said first surface length at least about 15% greater than said second surface length.

31. The door of claim 30, wherein said second caliper is at least about 12% less than said first caliper.

32. The door of claim 30, wherein said concave portion has a third caliper less than said first caliper.

33. The door of claim 30, wherein said third caliper is at least about 12% less than said first caliper.

34. The door of claim 30, wherein at least one of said door skins comprises a plurality of inner planar areas, each of said inner planar areas surrounded by and integral with a corresponding contoured portion.

35. The door of claim 34, wherein each of said inner planar areas is rectangular is plan.

36. The door of claim 30, wherein said convex portion subtends an angle of at least about 75°.

* * * * *